United States Patent [19]

Byeon

[11] Patent Number: 5,561,651

[45] Date of Patent: Oct. 1, 1996

[54] SYSTEM FOR REDUCING LEAD-IN TIME IN A LASER DISK REPRODUCING APPARATUS

[75] Inventor: Young-ki Byeon, Seoul, Rep. of Korea

[73] Assignee: Samsung Electronics Co., Ltd., Kyungki-do, Rep. of Korea

[21] Appl. No.: 92,445

[22] Filed: Jul. 14, 1993

[30] Foreign Application Priority Data

Jul. 14, 1992 [KR] Rep. of Korea .................... 92-12526

[51] Int. Cl.$^6$ ........................................ G11B 7/00
[52] U.S. Cl. .................. 369/50; 369/54; 369/58
[58] Field of Search ................... 369/54, 58, 47, 369/50, 48, 53, 55, 56, 57, 44.27, 44.28, 44.32

[56] References Cited

U.S. PATENT DOCUMENTS

| | | | |
|---|---|---|---|
| 4,656,617 | 4/1987 | Nakatsuyama et al. | 369/44.29 |
| 5,172,354 | 12/1992 | Otsubo | 369/54 |

Primary Examiner—Georgia Y. Epps
Assistant Examiner—P. W. Huber
Attorney, Agent, or Firm—Sughrue, Mion, Zinn, Macpeak & Seas

[57] ABSTRACT

A lead-in time reduction system determines if a disk is loaded at the time of turning on an initial focus-on function in a laser disk reproducing apparatus. If it is determined that the disk has been loaded, a pick-up is moved directly to a limit switch-on point using a feed motor only. The lead-in time reduction system includes determining if the disk is loaded by checking whether data is picked-up through the pick-up after the pick-up is located on a focus on point, if it is determined that the disk is loaded in the determining step, controlling the feed motor to move the pick-up directly to a limit switch-on point of the laser disk, and if the limit switch is turned on in the controlling step, reproducing a desired program by using picked-up information after picking up a lead-in region of the laser disk. Thus, the lead-in time which is completed before searching the location of the substantial program to be reproduced after the power is turned on, can be reduced as compared with the conventional technology.

8 Claims, 2 Drawing Sheets

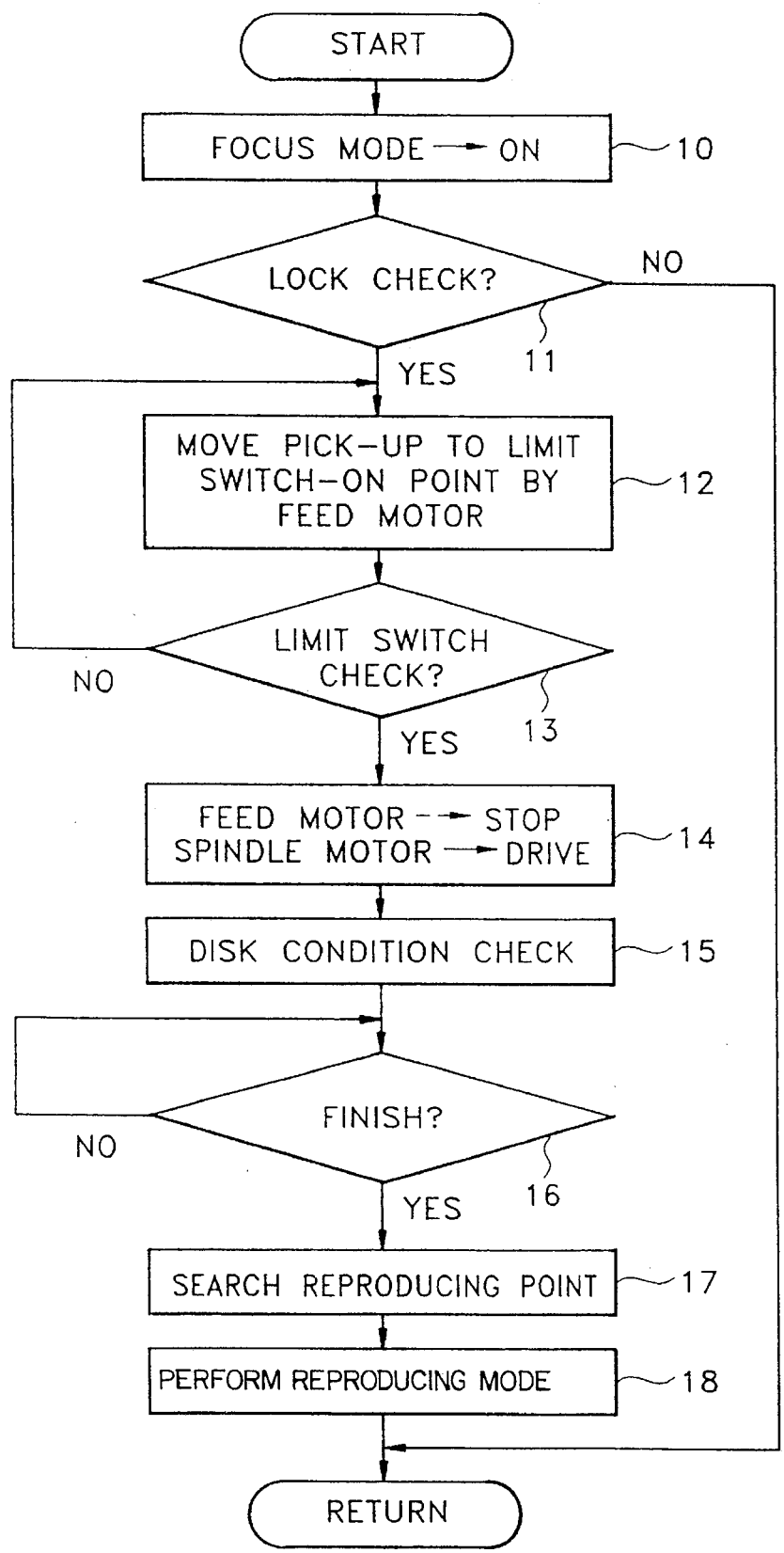

5,561,651

SYSTEM FOR REDUCING LEAD-IN TIME IN A LASER DISK REPRODUCING APPARATUS

FIELD OF THE INVENTION

The present invention relates to a reproducing system in a laser disk reproducing apparatus, and more particularly to a method and apparatus for reducing a lead-in time by controlling a pick-up movement. The present disclosure is based on the disclosure of Korean Patent Application No. 92-12526 filed Jul. 14, 1992, which disclosure is incorporated herein by reference.

BACKGROUND OF THE INVENTION

Recently, a compact disk, a laser disk and so on have been used as data storage apparatuses for storing video and audio data, etc. In data storage apparatuses which use such disks, data is recorded in pits each of which has a constant width in the direction of tracks which are concentrically formed on the disk. The disk player using such disks irradiates a laser beam to the pit, detects any variation of the reflected laser beam, and reads the data recorded on the disk to perform a reproduction operation. Regions of the disk are divided into a lead-in region, a program region and a lead-out region. Table of contents (TOC) data is recorded in the lead-in region. The record data, for example, a control signal (such as "during-music," "inter-music," "music number," "running play time," etc., in the case of audio recordings) is recorded in the program region, together with the audio or video data signals. A control signal which represents the end of the play is recorded in the lead-out region.

As compact disks and laser disks are of differing diameters, to check whether a compact disk is loaded onto the compact disk player, a focus-on point and a limit switch-on point are both established at the same location. However, for laser disks, the above two points are respectively established as different locations on the disk. That is, FIG. 1 shows the locations of the focus-on point and the limit switch-on point on a laser disk 10, in which reference numeral 2 denotes the focus-on point and reference numeral 3 denotes the point where the limit switch is turned on. The focus-on point and the limit switch-on point are different from each other in order to discriminate the type (compact disk versus laser disk) of the loaded disk in a reproducing apparatus which uses both types of disks. Here, the focus-on point of the laser disk is located outside of the lead-out region of the compact disk.

To check if laser disk 10 of FIG. 1 is loaded when power is applied, the conventional lead-in operation performed in the laser disk reproducing apparatus for laser disks having the above structure is made to transfer a pick-up (not shown) to focus-on point 2 thereby completing the focussing operation.

In this case, if the focussing is not completed, it is determined that the laser disk 10 is not loaded. In the case of a reproducing apparatus which commonly uses a compact disk as described above, the pick-up (not shown) is moved to a focus-on point corresponding to the compact disk, to again make an attempt at focussing. However, in the case of a reproducing apparatus for use only with laser disks, the reproducing apparatus is set to a standby mode until the laser disk is loaded.

On the other hand, if the above focussing is completed, a spindle motor (not shown) is driven, the pick-up (not shown) jumps the track of the laser disk which rotates according to the drive of the spindle motor, to move the pick-up to the above limit switch-on point. Then, when the picku-up reaches the switch-on point, the lead-in region on which the disk condition information is loaded is read out.

As described above, the spindle motor is driven so that the pick-up reaches the limit switch-on point after the focussing is completed, and the pick-up is moved while the tracking is controlled so that a track-jumping operation is performed by the use of an objective lens. Accordingly, the required lead-in time (completed before searching the location of the program to be reproduced and after the focussing is completed) is equal to the time needed for performing the above-described operation.

SUMMARY OF THE INVENTION

Therefore, to solve the above problems, it is an object of the present invention to provide a method and apparatus for reducing a lead-in time in a laser disk reproducing apparatus, in which, if a laser disk is loaded after a focussing operation is initiated, a pick-up is directly moved to a limit switch-on point without performing a tracking control operation (such as track-jumping) or controlling the drive of a spindle motor, in order to reduce the lead-in time.

To accomplish the above object of the present invention, there is provided a method and apparatus for reducing a lead-in time in a laser disk reproducing apparatus having a pick-up, a feed motor for controlling movement of the pick-up, and a spindle motor for rotating a disk, the method comprising the steps of:

determining if the disk is loaded by checking whether data is picked-up through the pick-up after the pick-up is located on a focus on point;

controlling the feed motor to move the pick-up directly to a limit switch-on point of the laser disk, if it is determined that the disk is loaded in the determing step; and reproducing a desired program by using the picked-up information after picking up a lead-in region of the disk, if the limit switch is turned on in the controlling step.

BRIEF DESCRIPTION OF THE DRAWINGS

The above, object and advantages of the present invention will become more apparent by describing in detail a preferred embodiment of the present invention with reference to the attached drawings in which:

FIG. 3 is a flow-chart diagram representing a method according to one embodiment of the present invention.

DETAILED DESCRIPTION OF THE PREFERRED EMBODIMENT

A preferred embodiment of the present invention will be described below with reference to the accompanying drawings in more detail.

Figure 2:
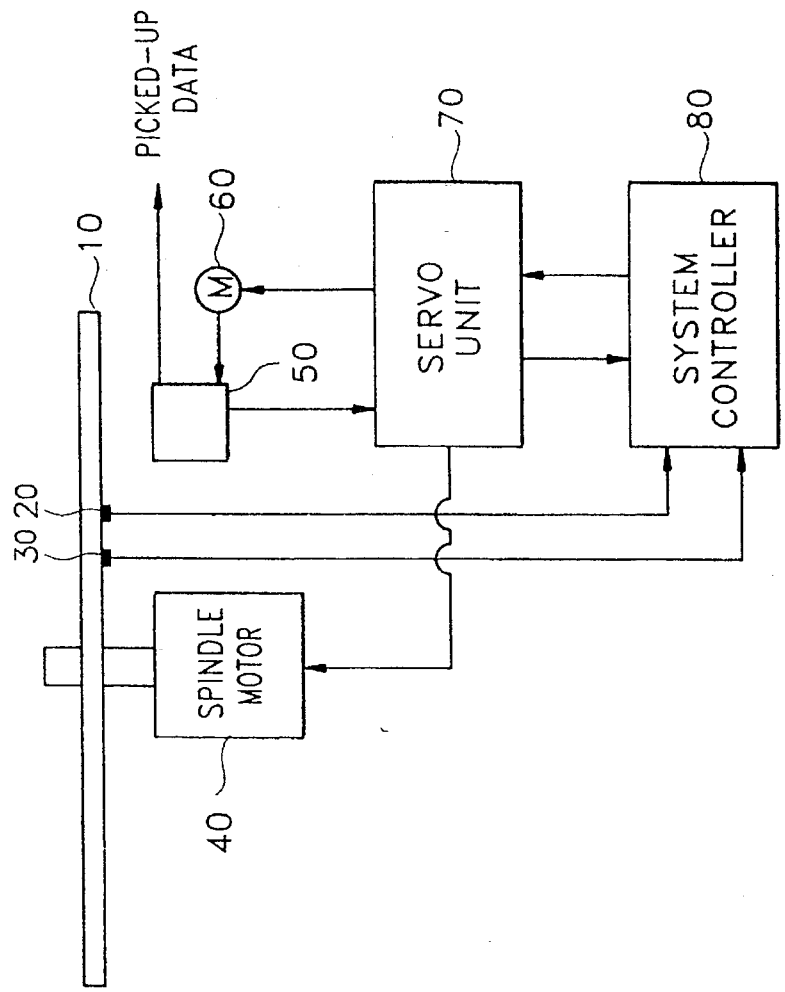
FIG. 2 is a schematic block diagram of an apparatus for performing a method according to one embodiment of the present invention.

FIG. 2 is a schematic block diagram of a laser disk reproducing apparatus for performing a method for reducing a lead-in time according to one embodiment of the present invention. Here, the present embodiment represents an example which is applied to a laser disk exclusive-use reproducing apparatus. However, the present invention can be applied to a disk reproducing apparatus which commonly uses a compact disk in addition to the laser disk.

Figure 1:
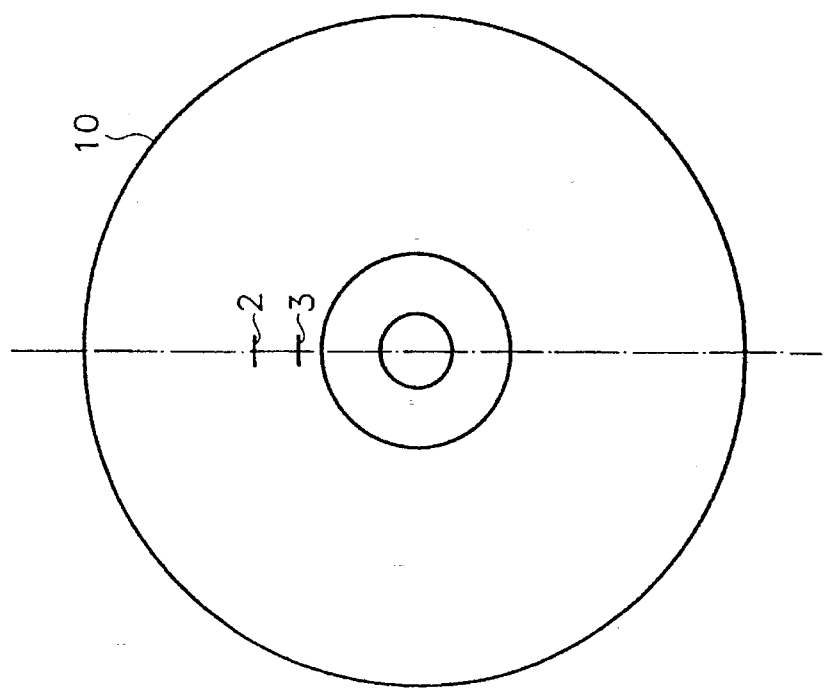
FIG. 1 shows locations of a focus-on point and a limit switch-on point on a laser disk.

Referring to FIG. 2, the laser disk reproducing apparatus comprises a laser disk 10, a focus switch 20 located below a focus-on point 2 (FIG. 1) which is the innermost circumferential point on the laser disk among points on which substantial information is loaded after power is turned on, and a limit switch 30 located below a limit switch-on point 3 (FIG. 1) which is the innermost circumferential point on the laser disk among points on which recorded information is located within lead-in regions on the disk, a spindle motor 40 located under the laser disk for controlling rotation thereof, a pick-up 50 for outputting data picked-up from laser disk 10 to a high-frequency shaping circuit (not shown), a feed motor 60 for controlling the radial movement of pick-up 50, a servo unit 70 which receives information according to the movement of pick-up 50 as one input signal, and controls the driving operations of spindle motor 40 and feed motor 60, and a system controller 80 which receives conditional information with respect to focus switch 20 and limit switch 30 according to the movement of pick-up 50 as input signals, and of which other input/output terminals are connected to input/output terminals of servo unit 70.

FIG. 3 is a flow-chart diagram representing a method of reducing a lead-in time according to one embodiment of the present invention. In steps 10 and 11, it is checked whether laser disk 10 is loaded. In steps 12 and 13, pick-up 50 is moved to limit switch-on point 3. In steps 14–16, the lead-in region is read to check the condition of the disk. In steps 17 and 18, a reproduction mode is controlled.

The operation of performing the method shown in FIG. 3 is described below with reference to the block diagram of FIG. 2.

When the power is applied, pick-up 50 starts focussing by turning on a focus mode at focus-on point 2 on laser disk in step 10, as in the above-described conventional technology. Then, a lock-check operation is performed in step 11, whereby it is determined whether the data (or information) is picked up through pick-up 50. The data picked up from pick-up 50 is output through a high-frequency shaping circuit (not shown) as described above. Accordingly, the result as to whether or not the data has been picked up is fed to system controller 80.

In step 11, if the data is not picked up, it is determined that laser disk 10 is not loaded as in the conventional technology, and remains in a standby mode. On the other hand, if the data is picked up in step 11, system controller 80 controls feed motor 60 so that pick-up 50 moves directly to limit switch-on point 3 through servo unit 70 in step 12. Here, pick-up 50 is moved directly to limit switch-on point 3 on laser disk by means of feed motor 60 only, in a state in which tracking by the objective lens is not controlled. The data with respect to the movement distance is continuously provided through servo unit 70 from system controller 80, until the limit switch 30 mounted on a pick-up transfer unit (not shown) is turned on in step 13.

If, in step 13, limit switch 30 is turned on, servo unit 70 stops feed motor 60 and drives spindle motor 40 in step 14. If the rotation of the disk is kept at a normal speed according to the drive of spindle motor 40, feed motor 60 is again driven. Accordingly, pick-up 50 picks up the lead-in region on the disk in step 15. Here, the information loaded in the lead-in region is the conditional information (or sub-information) with respect to the data loaded on the disk which is currently mounted as can be generally seen.

If the checking of such conditional information is completed in step 16, the desired program to be reproduced is selected using the information picked up from the lead-in region. Once the selection is completed, the reproducing point of the corresponding program is searched in step 17, and upon completion of the searching with respect to the reproducing point, the reproduction of the searched point is performed in step 18.

As described above, in the laser disk reproducing apparatus, the present invention determines if a laser disk is loaded after the focussing is turned on at a focus-on point. Then, if it determined that a laser disk is loaded, the pick-up is moved directly to the limit switch-on point. Accordingly, the present invention has an advantage of reducing the time needed for performing the lead-in as compared with the conventional technology, by performing tracking operations from the focus-on point to the limit switch-on point.

What is claimed is:

1. A method for reducing a lead-in time in a laser disk reproducing apparatus having a pick-up, a feed motor for controlling movement of the pick-up and a spindle motor for rotating a laser disk, said method comprising the steps of:

determining if said disk is loaded in the apparatus based on a focus-on point of said laser disk; and controlling said feed motor to move said pick-up directly to a limit switch-on point of said laser disk which is different front said focus-on point, if it is determined that said disk is loaded in said determining step where in the apparatus further has a limit switch disposed at the limit switch-on point and said limit switch is turned on when said pick-up is disposed at the limit switch-on point; and reproducing a desired program by using picked-up information after picking up information in a lead-in region of said laser disk, if said limit switch is turned on in said controlling step.

2. The method for reducing a lead-in time according to claim 1, wherein said controlling step is performed such that said pick-up does not perform operational controls of said spindle motor and track jump operations, but is moved by controlling said feed motor only.

3. The method for reducing a lead-in time according to claim 1, wherein said determining step includes checking whether data is picked-up through said pick-up after the pick-up is located at a focus on point.

4. The method for reducing a lead-in time according to 1, further comprising the step of:

driving said spindle motor to rotate said disk after said pick-up is moved to said limit switch-on point.

5. A laser disk reproducing apparatus, comprising:

a pick-up;

a feed motor for controlling movement of said pick-up;

a spindle motor for rotating a laser disk;

means for determining if the disk is loaded in the apparatus based on a focus-on point of said laser disk; and means for controlling said feed motor to move said pick-up directly to a limit switch-on point of the disk different from said focus-on point, if it is determined that the disk is loaded, wherein the apparatus further has a limit switch disposed at the limit switch-on point and said limit switch is turned on when said pick-up is disposed at the limit switch-on point, and reproducing a desired program by using pickup information after picking up information in a lead-in region of said laser disk, if said limit switch is turned on.

6. The laser disk reproducing apparatus according to 5, wherein said means for controlling said feed motor moves said pick-up directly to said limit switch-on point of the disk without performing a tracking control operation.

7. The laser disk reproducing apparatus according to 5, wherein said means for controlling said feed motor moves said pick-up directly to said limit switch-on point of the disk by controlling said feed motor only.

8. The laser disk reproducing apparatus according to 5, further comprising:

means for controlling said spindle motor to rotate said laser disk after said pick-up is moved to said limit switch-on point.

\* \* \* \* \*